(12) United States Patent
De Raeve et al.

(10) Patent No.: US 12,442,392 B2
(45) Date of Patent: Oct. 14, 2025

(54) ROTARY PRESSURE EXCHANGER

(71) Applicant: Sulzer Management AG, Winterthur (CH)

(72) Inventors: Karel De Raeve, Winterthur (CH); Bartosz Kus, Winterthur (CH)

(73) Assignee: Sulzer Management AG, Winterthur (CH)

( * ) Notice: Subject to any disclaimer, the term of this patent is extended or adjusted under 35 U.S.C. 154(b) by 166 days.

(21) Appl. No.: 18/241,201

(22) Filed: Aug. 31, 2023

(65) Prior Publication Data

US 2024/0077089 A1 Mar. 7, 2024

(30) Foreign Application Priority Data

Sep. 5, 2022 (EP) .................................. 22193935

(51) Int. Cl.
*F04F 13/00* (2009.01)

(52) U.S. Cl.
CPC .................................... *F04F 13/00* (2013.01)

(58) Field of Classification Search
CPC .............. F04F 13/00; F05C 2201/0448; F05C 2203/08; F04B 1/20; F04B 1/2035; F01B 3/0032; F01B 3/0052; F03C 1/0636; F03C 1/0644

See application file for complete search history.

(56) References Cited

U.S. PATENT DOCUMENTS

| | | | |
|---|---|---|---|
| 2,762,557 A | 9/1956 | Jendrassik | |
| 6,537,035 B2* | 3/2003 | Shumway | F04F 13/00 417/64 |
| 2002/0146325 A1 | 10/2002 | Shumway | |
| 2012/0257991 A1* | 10/2012 | Woodthorpe | F04F 13/00 417/92 |
| 2019/0277110 A1* | 9/2019 | Shampine | F04B 15/02 |
| 2021/0246910 A1 | 8/2021 | Hauge | |

FOREIGN PATENT DOCUMENTS

EP 2694819 B1 5/2017

OTHER PUBLICATIONS

European Search Report issued Feb. 21, 2023 in corresponding European Application No. 22183935.8.

* cited by examiner

*Primary Examiner* — Kenneth J Hansen
(74) *Attorney, Agent, or Firm* — Global IP Counselors, LLP

(57) ABSTRACT

A rotary pressure exchanger includes a housing and a rotor mounted within the housing for rotation about an axis of rotation defining an axial direction. The rotor extends from a first rotor end in the axial direction to a second rotor end, a plurality of channels is inside the rotor for transferring pressure from the first fluid to the second fluid, and each channel extends parallel to the axis of rotation. The plurality of channels includes a set of first channels and a set of second channels, and the rotor includes a divider arranged between the first rotor end and the second rotor end for separating the first channels from the second channels, Each first channel extends from the first rotor end in the axial direction to the divider, and each second channel extends from the second rotor end in the axial direction to the divider.

14 Claims, 6 Drawing Sheets

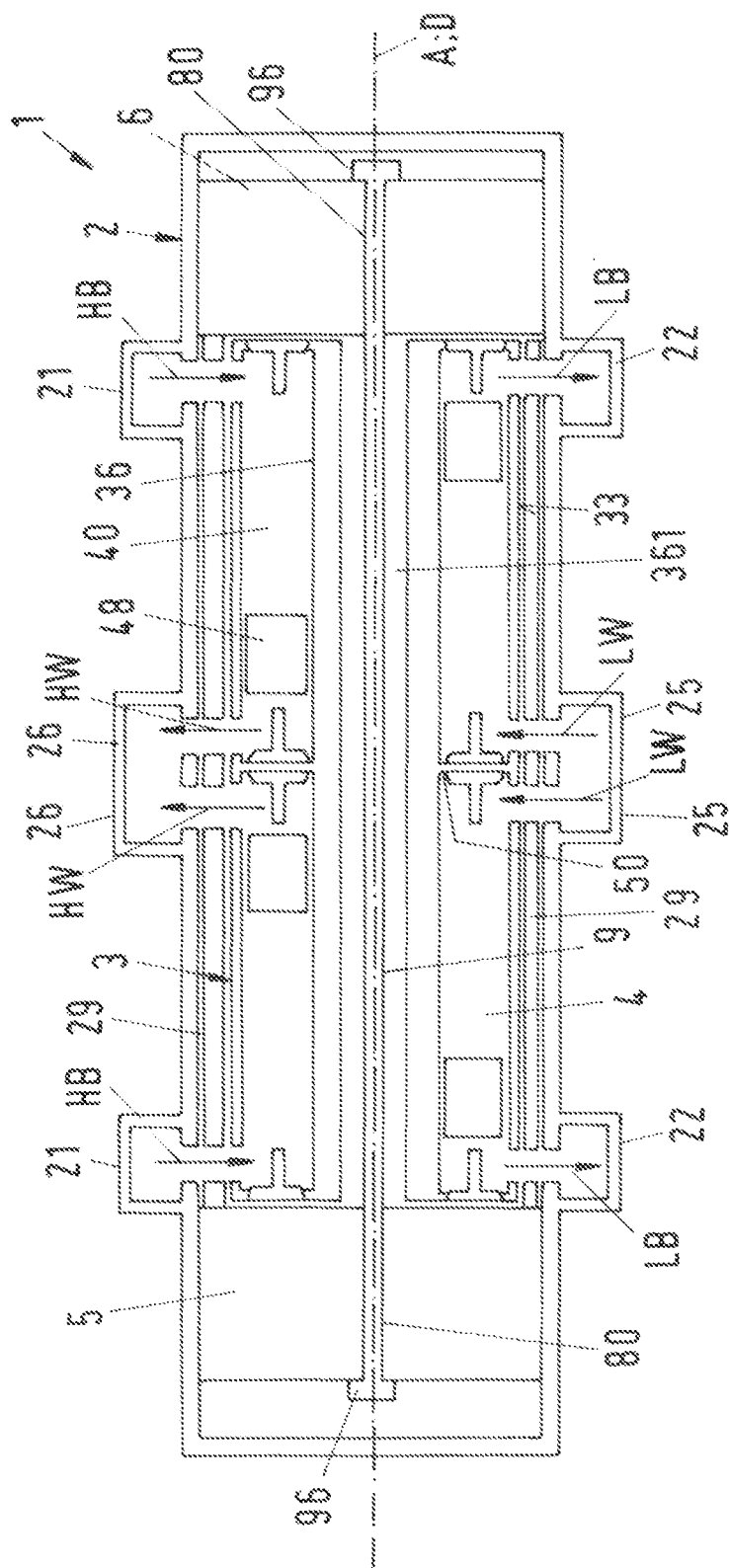

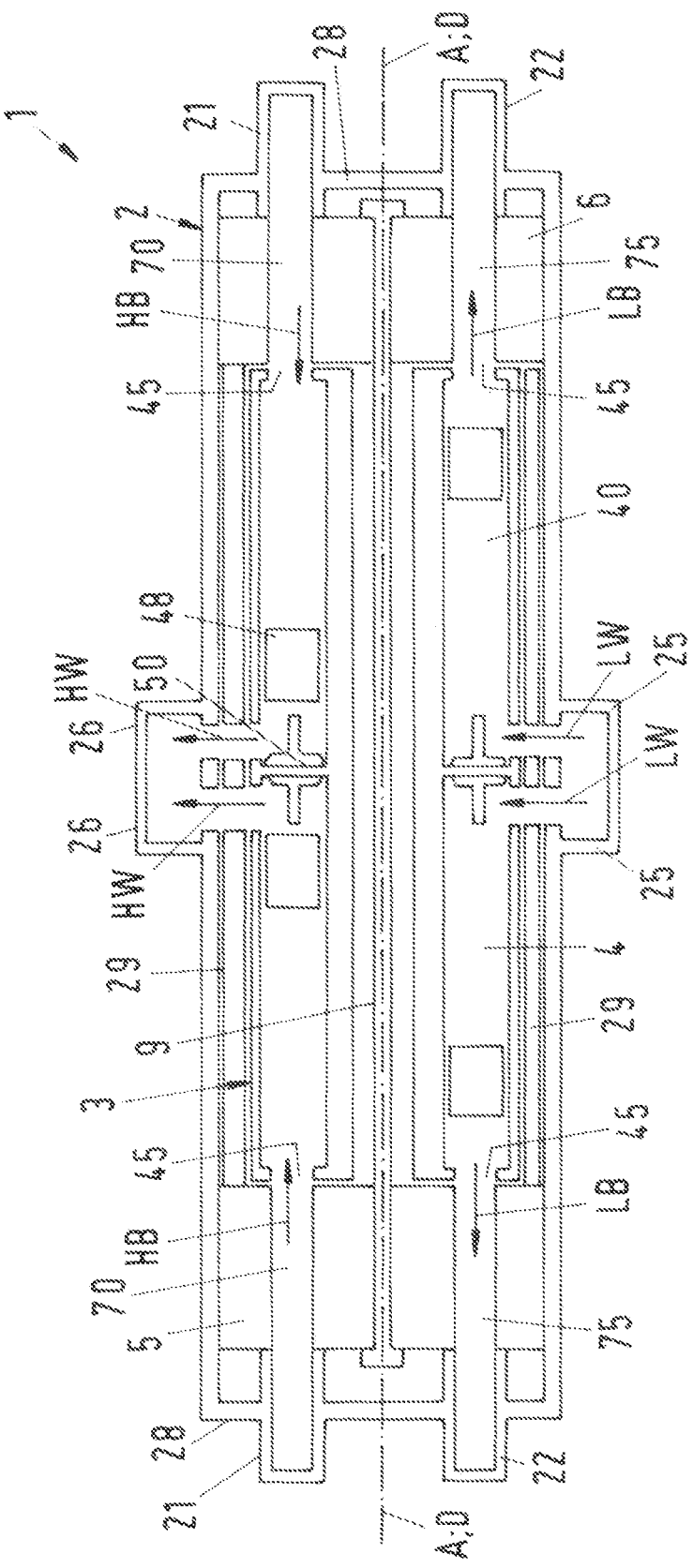

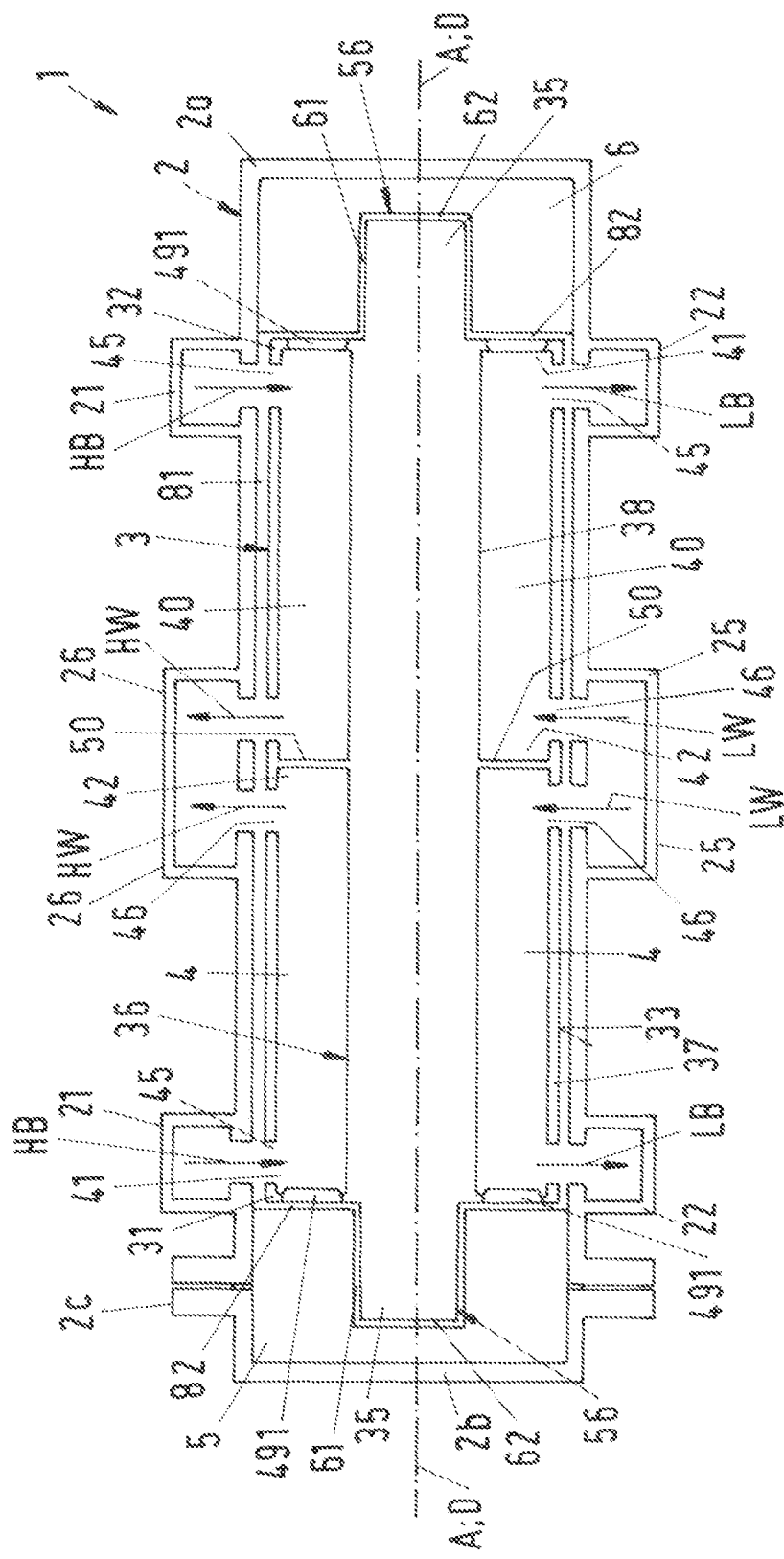

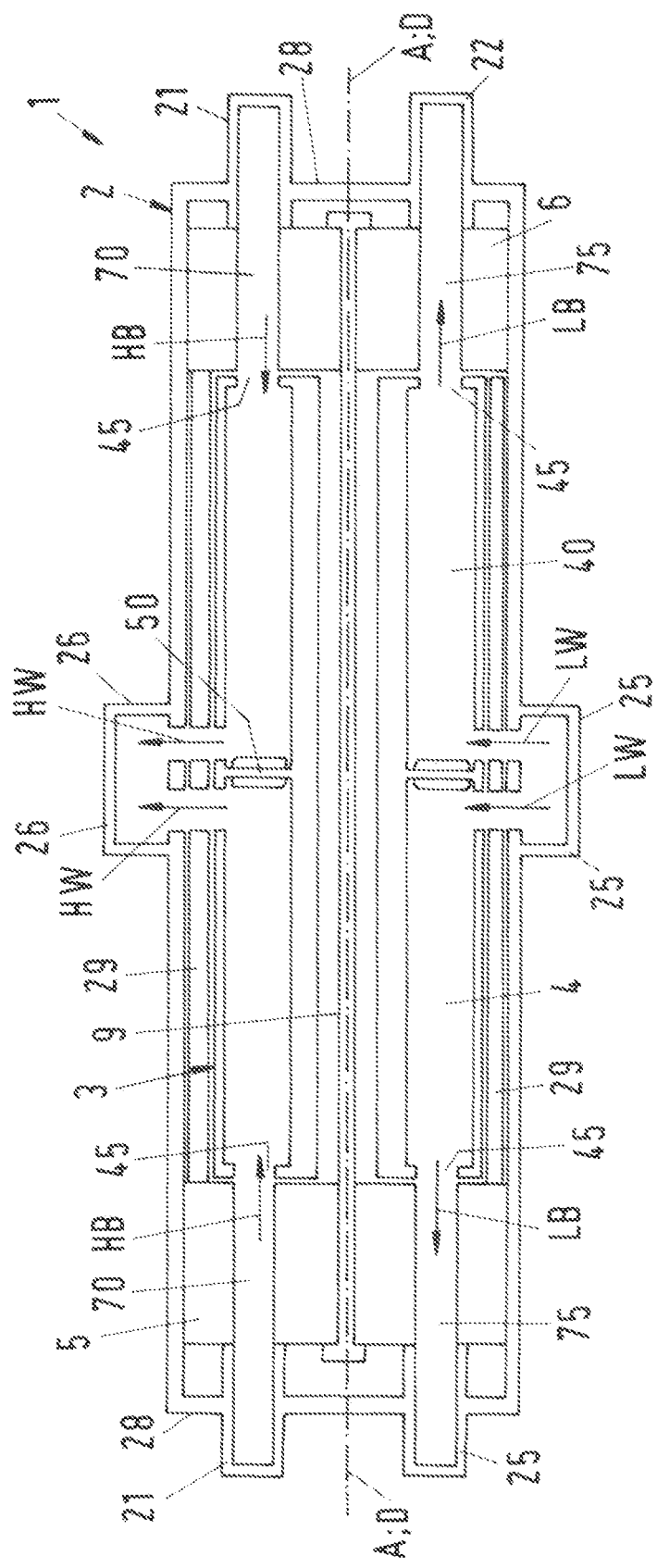

ROTARY PRESSURE EXCHANGER

CROSS-REFERENCE TO RELATED APPLICATION

This application claims priority to European Application No. 22193935.8, filed Sep. 5, 2022, the contents of which are hereby incorporated by reference.

BACKGROUND

Technical Field

The disclosure relates to a rotary pressure exchanger for transferring pressure from a first fluid to a second fluid in accordance with the preamble of the independent claim.

Background Information

Rotary pressure exchangers are used to transfer energy in the form of pressure from a first fluid available at a high pressure to a second fluid available at a low pressure. Usually, the energy transfer takes place by a positive displacement of the fluids following Pascal's principle. Such rotary pressure exchangers are configured with a rotor which is driven by the fluids or by an external motor. A well-known application of rotary pressure exchangers is the field of reverse osmosis systems, for example Sea Water Reverse Osmosis (SWRO) for desalination of seawater or brackish water. Here, the rotary pressure exchanger is used as an efficient energy recovery device.

SUMMARY

In reverse osmosis systems a semipermeable membrane is used that can be passed by the water or the solvent but not by solutes like dissolved solids, molecules or ions. For reverse osmosis the membrane is supplied with a pressurized feed fluid for example seawater. Only the solvent, for example the water, can pass the membrane and will leave the membrane unit as permeate fluid, for example fresh water. The remaining part of the feed fluid that does not pass through the membrane is discharged from the membrane unit as concentrate fluid, for example brine. The feed fluid has to be supplied to the membrane with a high pressure to overcome the osmotic pressure.

Thus, reverse osmosis typically is a process where a pressurized feed fluid is required and the concentrate fluid leaving the membrane unit still has a considerably large residual pressure that enables to recover a part of the pressurizing energy as mechanical energy. In seawater desalination, for example, the required pressure of the feed fluid (seawater) can be from 45 bar to 75 bar depending among others on the salinity and the temperature of the seawater. The pressure in the fresh water (permeate fluid) can be between zero and three bars, the pressure in the brine (concentrate fluid) is typically between 2 and 5 bars less than the feed pressure. i.e. 40-73 bar.

Rotary pressure exchangers are used to transfer pressure from the brine, which is still at a considerably high pressure, to the feed fluid, thus recovering energy from the brine.

The rotor of a rotary pressure exchanger is typically designed to include straight axially oriented ducts or channels, in which the pressure transfer takes place by positive displacement of the fluids. It is known to arrange the rotor between two stationary end covers which are used to supply the fluids to the rotor and to discharge the fluids from the rotor. For positioning and supporting the rotor it is known to use an axle which is arranged at the center of the rotor as it is disclosed for example in U.S. Pat. No. 10,125,796. Another known solution is a sleeve positioning concept, where the rotor is surrounded by a stationary sleeve. During operation of the device the narrow gap between the rotor and the sleeve provides a hydrodynamic support of the rotor.

In known rotary pressure exchangers, the pressure of the brine (first fluid) is transferred to the fresh seawater (second fluid) by direct contact between the brine and the fresh seawater. A mixing zone develops between the brine and the fresh seawater, the so-called liquid plug. This mixing of brine and fresh seawater results in mixing losses. This results in an increased salt concentration in the fresh seawater, that is supplied to the reverse osmosis membranes. The increased salt concentration can cause an increase of the energy consumption of the overall reverse osmosis system.

To avoid the increase in energy consumption a freely slidable physical plug can be provided as a separator in each channel for reducing a mixing of the first fluid (brine) and the second fluid (fresh seawater). By this measure these mixing losses can be significantly reduced. Such a configuration with a freely slidable separator is for example disclosed in U.S. Pat. No. 6,773,226.

The plug will reciprocate within the channel during the rotation of the rotor of the pressure exchanger. Thus, the plugs in the different channels will be positioned somewhere between their respective turning points as a function of the angular position of the channel with respect to the inlet and outlet ports of the rotor. The asymmetric and changing positions of the physical plugs can result in a mechanical unbalance which causes considerable vibrations of the rotor.

Thus, a negative impact of the physical plugs is the occurrence of vibrations which are introduced by the mechanical unbalance generated by the asymmetric positioning of the plugs reciprocating in the channels.

Therefore, it can be that the benefit of improved efficiency of the system by a reduced mixing of the brine and the fresh seawater because of the physical plugs is accompanied by the induced vibrations related to the unbalance which is created by the reciprocating plugs.

Furthermore, it is desired that the rotary pressure exchanger has a compact design, meaning that the maximum flow rate through the rotary pressure exchanger in relation to the dimensions of the rotary pressure exchanger, e.g. its diameter and its length, should be as large as possible. Thus, the maximum flow rate per size of the rotary pressure exchanger should be as large as possible.

Starting from this state of the art, it is therefore an object of the disclosure to provide a rotary pressure exchanger enabling a high flow rate in relation to the size of the rotary pressure exchanger.

The subject matter of the disclosure satisfying this object is characterized by the features described herein.

Thus, according to the disclosure, a rotary pressure exchanger is proposed for transferring pressure from a first fluid to a second fluid, comprising a housing and a rotor mounted within the housing for rotation about an axis of rotation defining an axial direction, wherein the rotor extends from a first rotor end in the axial direction to a second rotor end, wherein a plurality of channels is provided inside the rotor for transferring pressure from the first fluid to the second fluid, and wherein each channel extends parallel to the axis of rotation. The plurality of channels comprises a set of first channels and a set of second channels, and the rotor comprises a divider arranged between the first rotor end and the second rotor end for separating the first channels from the second channels, wherein each first channel extends from the first rotor end in the axial direction to the divider, and wherein each second channel extends from the second rotor end in the axial direction to the divider.

The single rotor of the pressure exchanger according to the disclosure comprises two pressure exchanger units, which are arranged in a back-to-back configuration.

The first pressure exchanger unit comprises the set of first channels extending from the first rotor end to the divider, and the second pressure exchanger unit comprises the set of the second channels extending from the second rotor end to the divider. Due to the back-to-back arrangement of the two pressure exchanger units with the divider between the two units the pressure exchanger according to the disclosure can be designed to have the same capacity, i.e. flow rate, as two conventional rotary pressure exchangers but a considerably smaller length, i.e. extension in the axial direction. This compact design allows for remarkably increase the flow rate in relation to the size of the rotary pressure exchanger.

According to a preferred configuration the number of first channels equals the number of second channels, and the first channels and the second channels are pairwise aligned with each other. Thus, each pair of a first channel and a second channel constitutes a passage extending from the first rotor end in the axial direction and parallel to the axis of rotation to the second rotor end, wherein the divider is arranged in the passage to separate the first channel from the second channel, so that no fluid can flow directly from the first channel into the second channel. For each pair of a first channel and a second channel the flow of the first or the second fluid in the first channel is always opposite to the flow in the second channel, i.e. the first/second fluid flows in both the first and the second channel from the respective rotor end towards the divider, or the first/second fluid flows in both the first and the second channel from the divider towards the respective rotor end. This symmetry is advantageous regarding a reliable and efficient operation of the rotary pressure exchanger.

To further increase the symmetry of the rotor, it is preferred that all channels have the same length as measured in the axial direction. Therefore, it is preferred that the divider is arranged in the middle between the first rotor end and the second rotor end, so that the distance in axial direction between the first rotor end and the divider equals the distance in axial direction between the second rotor end and the divider.

According to a preferred configuration the housing comprises two first fluid inlet ports for supplying the first fluid to the first channels and to the second channels, two first fluid outlet ports for discharging the first fluid from the first channels and from the second channels, two second fluid inlet ports for supplying the second fluid to the first channels and to the second channels, two second fluid outlet ports for discharging the second fluid from the first channels and from the second channels, wherein the first fluid inlet ports and the first fluid outlet ports are arranged at the first and the second rotor end, and wherein the second fluid inlet ports and the second fluid outlet ports are arranged near the divider with respect to the axial direction. Thus, regarding the axial direction, the divider is located between the two second fluid inlet ports and between the two second fluid outlet ports.

Regarding this configuration it is preferred that each second fluid inlet port is configured as a radial inlet port, such that the second fluid enters the rotor in a radial direction perpendicular to the axial direction, and wherein each second fluid outlet port is configured as a radial outlet port, such that the second fluid leaves the rotor in the radial direction.

It is also possible to interchange the position of the first fluid ports and the second fluid ports. I.e. the first fluid inlet ports and the first fluid outlet ports are then arranged near the divider with respect to the axial direction, and the second fluid inlet ports and the second fluid outlet ports are arranged at the first and the second rotor end.

Furthermore, it is preferred that the rotor comprises a circumferential surface delimiting the rotor with respect to the radial direction, wherein each channel, i.e. each first channel and each second channel, comprises a first opening and a second opening for the fluids, wherein each first opening is arranged near the divider and each second opening is arranged near the first rotor end or near the second rotor end, and wherein each first opening is arranged in the circumferential surface of the rotor.

According to a preferred configuration each second opening is arranged in the circumferential surface of the rotor.

Regarding the configuration of the first fluid inlet ports and the first fluid outlet ports arranged at the first rotor end and the second rotor end, embodiments are possible, in which the ports are configured as radial ports. In other embodiments the ports are configured as axial ports.

Thus, according to a first preferred embodiment each first fluid inlet port is configured as a radial inlet port, such that the first fluid enters the rotor in the radial direction perpendicular to the axial direction, and each first fluid outlet port is configured as a radial outlet port, such that the first fluid leaves the rotor in the radial direction.

Preferably, in the first embodiment each of the fluid ports, i.e. each of the first fluid inlet ports, the second fluid inlet ports, the first fluid outlet ports and the second fluid outlet ports, is configured as a radial port.

By configuring all fluid ports as radial ports, both fluids enter the rotor and leave the rotor in the radial direction. By this measure, the distance as measured in the circumferential direction between the first inlet ports and the first outlet ports as well as the distance between the second inlet ports and the second outlet ports can be increased. This results in a considerable reduction of the leakage flow from the first inlet ports to the first outlet ports and in a considerable reduction of the leakage flow between the second outlet ports and the second inlet ports. The reduction of the leakage flow increases the efficiency of the rotary pressure exchanger.

In addition, the configuration of all fluid ports as radial ports makes it possible to reduce the overall length of the rotary pressure exchanger regarding the axial direction, because there is no longer the need to supply and to discharge the fluids in the axial direction to and from the rotor.

Furthermore, in particular the configuration of the fluid inlet ports as radial ports has the advantage that the torque for driving the rotation of the rotor by the fluids is easier to control and to adjust. The configuration of the fluid inlet ports renders possible a better design control of the driving momentum created by imparting a circumferential velocity component to the incoming fluid supplied to the rotor. In addition, due to reduced geometrical constraints regarding the fluid inlet ports, higher values of the driving torque can be realized. A strong driving torque can be advantageously used, for example, to drive a roller bearing based system for the rotor, or overcoming resistance of additional seals that could be used to further limit the leakage between the different ports.

Preferably, the first fluid inlet port and the first fluid outlet port disposed at the first rotor end and the second rotor end, respectively, are arranged at the same axial position and opposite each other with respect to the circumferential direction both at the first rotor end and at the second rotor end. In addition, the second fluid inlet ports and the second fluid outlet ports are arranged pairwise at the same axial position and opposite each other with respect to the circumferential direction. The first pair of second fluid inlet port and second fluid outlet port is arranged on the one side of the divider, and the second pair of second fluid inlet port and second fluid outlet port is arranged on the other side of the divider (regarding the axial direction). The axial position of the first fluid inlet ports/outlet ports is spaced apart from the axial position of the second fluid inlet ports/outlet ports. By arranging the first fluid inlet ports opposite the first fluid outlet ports, the distance between the two ports measured in the circumferential direction can be maximized. By arranging the second fluid inlet ports opposite the second fluid outlet ports, the distance between the two ports measured in the circumferential direction can be maximized. These measures are advantageous to decrease the leakage between the first fluid ports as well as the leakage between the second fluid ports.

Furthermore, the respective extension of each of the first fluid and the second fluid ports in the circumferential direction can be increased as compared to an axial arrangement of the ports. By increasing the extension of the ports in the circumferential direction, the flow rate through the rotary pressure exchanger can be increased, which is an advantage regarding the overall performance of the rotary pressure exchanger. The other way around, for a given flow rate the rotary pressure exchanger can be configured smaller and/or manufactured cheaper as compared to rotary pressure exchangers known in the art.

According to another preferred embodiment each first fluid inlet port is configured as an axial inlet port, such that the first fluid enters the rotor in the axial direction, and each first fluid outlet port is configured as an axial outlet port, such that the first fluid leaves the rotor in the axial direction. For this embodiment it is preferred that each of the second fluid inlet ports and each of the second fluid outlet ports is configured as a radial port.

In a preferred embodiment the pressure exchanger comprises a first end cover and a second end cover, with each end cover arranged stationary with respect to the housing, wherein the rotor is arranged between the first end cover and the second end cover regarding the axial direction. The axial faces at the first rotor end and at the second rotor end are arranged very close to the mating partner faces of the end covers with only a narrow clearance therebetween. The narrow clearance reduces the leakage and is advantageous in view of a hydrostatic support of the rotor.

In particular regarding configurations of the first fluid inlet ports and the first fluid outlet ports as radial ports arranged at the first rotor end and the second rotor end, both the first end cover and the second end cover can have a very simple configuration, e.g. a very simple geometry, because there is no need to discharge the fluids or to supply the fluids through the end covers. Thus, there is no need to provide any ports for the fluids in the end covers. This is an advantage regarding the manufacturing of the end covers, because the manufacturing becomes cheaper and less time consuming. Especially if the end covers are made of a material that is laborious or difficult to machine, e.g. a ceramic material, a simple geometry or a simple configuration of the end covers is an advantage.

Preferably each end cover is made of a ceramic material, because this allows for a very narrow clearance between the rotating components and the stationary mating components. Ceramic components are also very suitable for creating well-functioning hydrostatic bearings. Of course, it is also possible to choose other materials, i.e. non-ceramic materials for these components.

As a further preferred measure each rotor end can comprises a bearing pin extending in the axial direction and configured coaxially with the axis of rotation, wherein each end cover comprises a bearing recess configured for receiving one of the bearing pins, and wherein each bearing pin engages with one of the bearing recesses. The bearing pins, having a considerably smaller diameter than the circumferential surface of the rotor constitute an extension of the rotating axle, the centerline of which constitutes the axis of rotation, about which the rotor rotates during operation. Both bearing pins are preferably identically configured. Each bearing pin engages with one of the bearing recesses in the end covers, so that the rotor is journaled by the bearing pins arranged in the bearing recesses. The clearance between each bearing pin and the respective bearing recess is dimensioned very small, e.g. a few micrometers, to reduce the leakage providing lubrication for the hydrostatic bearings realized between the bearing pins and the bearing recesses.

Regarding the configuration with the bearing pins it is preferred, that at each rotor end a radial bearing flow passage and an axial bearing flow passage are provided between the bearing recess and the bearing pin engaging with the bearing recess, wherein each radial bearing flow passage is configured to provide hydrostatic radial support of the rotor, and wherein each axial bearing flow passage is configured to provide hydrostatic axial support of the rotor.

Thus, by the bearing recesses and the bearing pins engaging therewith, the rotor can be hydrostatically supported, wherein the radial flow passages extending about the outer circumferential surfaces of the bearing pins provide the radial bearings and the axial bearing flow passages arranged between the bearing pins and the respective bearing recess with respect to the axial direction provide the axial bearings for the rotor.

In addition, in the configuration with the bearing pins there is no need for an outer stationary sleeve surrounding the rotor for providing support to the rotor and for positioning the rotor. Therefore, the outer diameter of the rotor can be increased without increasing the inner diameter of the housing. Therewith, the maximum flow rate of the rotary pressure exchanger is increased.

Thus, compared to the sleeve-based positioning of the rotor. i.e. the rotor being surrounded by an external stationary sleeve, the configuration with the bearing pins makes it possible to increase the maximum flow rate per size of the rotary pressure exchanger.

In particular the combination of the bearing pins with the end covers having no ports, enables an improved pressure balancing of the end covers additionally aided by having a more rigid structure of the end covers.

The rotor can comprise an axle and a rotor body, wherein the axle comprises both bearing pins and extends from the bearing pin at the first rotor end to the bearing pin at the second rotor end, wherein the rotor body comprises all channels and the divider. The rotor body is fixedly connected to the axle in a torque proof manner. Thus, the rotor comprises two main components, namely the axle including the two bearing pins with a middle part connecting the bearing pins, and the rotor body, in which all the channels and the divider are arranged. This has the advantage that the axle and the rotor body can be made of different materials, each of which is particularly suited for the function of the respective component of the rotor.

The axle can be made of a first material, preferably a ceramic material, and the rotor body can be made of a second material, preferably a metallic material, wherein the first material is different from the second material. Thus, the use of materials which are more difficult to machine, such as ceramic materials, is reduced to the component, namely the axle, which requires the highest precision and the narrowest clearance to its mating partners. Other components, such as the rotor body can be made of a material, that is easier to machine, which reduces the costs. The rotor body is preferably made of a metallic material. In particular for SWRO applications a metallic material is preferred, which has a high resistance against corrosion, for example titanium. Thus, the rotor body can be made of titanium, for example, and then be fixed to the ceramic axle by a shrink-fit.

Furthermore, it is possible to configure the axle as a hollow axle comprising a central opening extending completely through the axle in the axial direction. Each end cover comprises a central bore aligned with the central opening, with each central bore extending completely through the end cover in the axial direction. A bolt extends in the axial direction through each central bore and through the central opening, and the bolt is secured to each end cover. This design has a particularly rigid and stable configuration of the rotor and the end covers. The stationary bolt extending through the hollow axle of the rotor and the end covers constitutes a tension rod securing the end covers to each other in a highly reliable manner, even at high pressure of the first or the second fluid. During operation, the hollow axle together with the rotor body rotates about the stationary bolt.

The bolt can be made of a single material, for example a metallic material. As an alternative, the bolt can comprise a central core extending in the axial direction along the entire length of the bolt, and a sleeve arranged coaxially with the core and abutting against the core. The sleeve can be made of a first material, preferably a ceramic material, and the central core can be made of a second material, preferably a metallic material, wherein the first material is different from the second material. Thus, the bolt can comprise two different materials and include, for example, a ceramic core and a metallic sleeve enclosing the ceramic core.

According to another preferred embodiment the rotary pressure exchanger comprises a rotor sleeve extending regarding the axial direction from the first end cover to the second end cover, with the rotor sleeve arranged stationary with respect to the housing, wherein the rotor is arranged within the rotor sleeve, so that the rotor sleeve surrounds the circumferential surface of the rotor. Regarding the rotor sleeve, this embodiment corresponds essentially to the sleeve-based positioning of the rotor, in which the clearance between the rotor sleeve and the circumferential surface of the rotor is used for a hydrostatic and/or hydrodynamic support of the rotor. This embodiment does not require the bearing pins at the rotor and the bearing recesses in the end covers making the end covers very simple components.

Regarding the configuration of the channels for configurations with radial fluid ports it is preferred that each channel extends from a first axial end to a second axial end, wherein at least one of the first axial end and the second axial end of each channel is provided with a closing element. Thus, each channel can be machined as a blind bore in the rotor, namely each first channel can be machined as a blind bore from the first rotor end to the divider, and each second channel can be machined as a blind bore from the second rotor end to the divider. Afterwards each blind bore is closed at its open end by the closing element. The first and the second opening of the channel can be machined by bores extending in the radial direction from the circumferential surface of the rotor into the channel.

According to still another preferred embodiment, in each channel a freely sliding separator is provided for reducing a mixing of the first fluid and the second fluid.

As it has been explained in the introduction, in conventional rotary pressure exchangers with physical separators in the channels, the reciprocating movement of the separators can result in a mechanical unbalance of the rotor causing considerable vibrations of the rotor. Different from the conventional rotary pressure exchangers, the rotary pressure exchanger according to the disclosure can include separators in the channels without causing strong vibrations of the rotor. This fact is due to the back-to-back arrangement of the two pressure exchanger units.

In each of the pressure exchanger units the separators in the respective channels cause a mechanical unbalance. Due to the back-to-back arrangement of the two pressure exchanger units, the mechanical unbalance of the first pressure exchanger unit is a mirror image of the mechanical unbalance of the second pressure exchanger unit. Therefore, the mechanical unbalance of the first pressure exchanger unit and the mechanical unbalance of the second pressure exchanger unit neutralize each other at least partially so that the rotor in its entirety is much better balanced as compared to prior art devices with separators in the channels.

Due to the considerably improved balance of the rotor, the vibrations of the rotor are remarkably reduced.

Thus, the pressure exchanger according to the disclosure having the back-to-back configuration can include separators in the channels and then combines the advantages of the reduced mixing losses (and thus an enhanced system efficiency) due to the separators in the channels with a very compact design enabling a high flow rate in relation to the size of the rotary pressure exchanger.

It can be understood that the term "separator" shall be understood within the framework of this application as a physical, solid element, which is different from a mixing zone consisting of a mixture of the first and the second fluid.

Each separator works comparable to a hydraulic piston and transfers pressure between the two fluids. Each separator can be configured for example as a free floating piston or as a ball.

Further advantageous measures and embodiments of the disclosure will become apparent from the dependent claims.

BRIEF DESCRIPTION OF THE DRAWINGS

The invention will be explained in more detail hereinafter with reference to embodiments as set forth in the drawings.

FIG. 4 illustrates a schematic cross-sectional view of a second embodiment of a rotary pressure exchanger according to the disclosure in a cut along the axial direction.

FIG. 5 illustrates a schematic cross-sectional view of a third embodiment of a rotary pressure exchanger according to the disclosure in a cut along the axial direction, FIG. 6 illustrates a schematic cross-sectional view of a fourth embodiment of a rotary pressure exchanger according to the disclosure in a cut along the axial direction, and FIG. 7 illustrates a schematic cross-sectional view of a fifth embodiment of a rotary pressure exchanger according to the disclosure in a cut along the axial direction.

DETAILED DESCRIPTION

Figure 1:
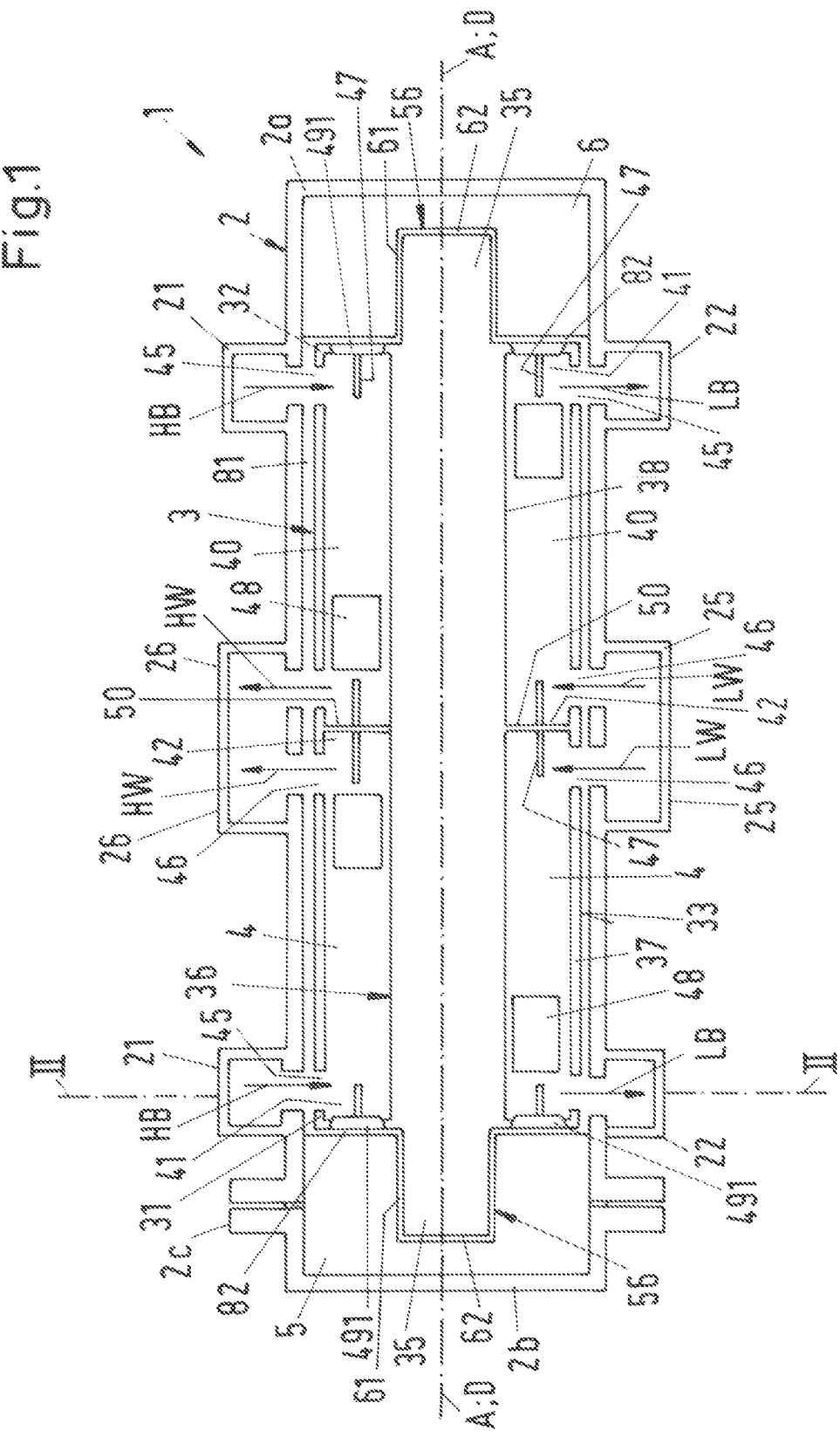
FIG. 1 illustrates a schematic cross-sectional view of a first embodiment of a rotary pressure exchanger according to the disclosure in a cut along the axial direction.

FIG. 1 shows a schematic cross-sectional view of a first embodiment of a rotary pressure exchanger according to the disclosure, which is designated in its entity with reference numeral 1. The rotary pressure exchanger 1 transfers energy in the form of pressure from a first fluid to a second fluid. The rotary pressure exchanger 1 comprises a housing 2 and a rotor 3, which is arranged in the housing 2 and mounted for rotating about an axis of rotation D defining an axial direction A. The rotor 3 extends from a first rotor end 31 in the axial direction A to a second rotor end 32 and comprises a circumferential surface 33 delimiting the rotor 3 with respect to the radial direction which is perpendicular to the axial direction A. The rotor ends 31, 32 and the circumferential surface 33 form an essentially cylindrical shape, with the axis of rotation D coinciding with the cylinder axis. The diameter of the circumferential surface 33 is slightly smaller than the inner diameter of the housing 2, such that there is a narrow rotor clearance 81 between the circumferential surface 33 of the rotor 3 and the inner wall of the housing 2 surrounding the circumferential surface 33. The rotor clearance 81 is adjusted on the one hand to allow a free, i.e. contactless, rotation of the rotor 3 in the housing 2, and on the other hand to allow only a very small leakage flow along the circumferential surface 33. In particular, the rotor clearance 81 restricts the leakage flow in the axial direction A, i.e. the leakage flow between the first rotor end 31 and the second rotor end 32.

Figure 2:
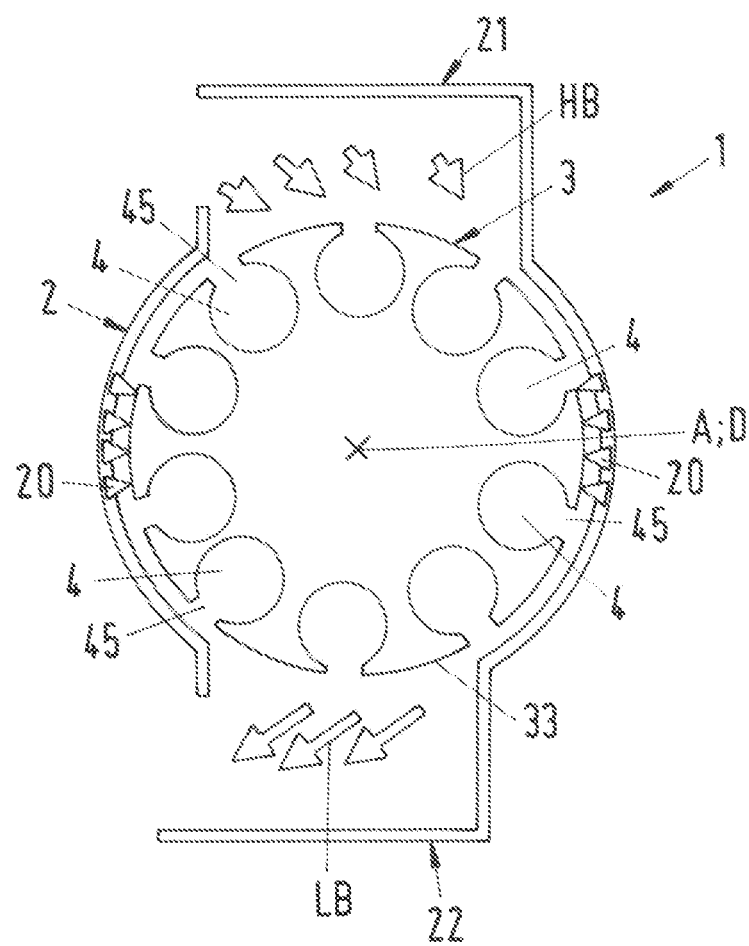
FIG. 2 illustrates a schematic cross-sectional view of the first embodiment in a cut perpendicular to the axial direction along the cutting line II-II in FIG. 1.

For a better understanding FIG. 2 shows the first embodiment of the rotary pressure exchanger 1 again, however in a cross-sectional view in a cut perpendicular to the axial direction A, i.e. in radial direction, and along the cutting line II-II in FIG. 1.

A plurality of channels 4, 40 is provided inside the rotor 3 for transferring pressure from the first fluid to the second fluid. Each channel 4, 40 extends parallel to the axis of rotation D. The plurality of channels 4, 40 comprises a set of first channels 4 and a set of second channels 40. The rotor 3 further comprises a divider 50 arranged between the first rotor end 31 and the second rotor end 32 for separating the first channels 4 from the second channels 40, so that no fluid can flow directly from one of the first channels 4 into one of the second channels 40.

Each first channel 4 extends from the first rotor end 31 in the axial direction to the divider 50 and each second channel 40 extends from the second rotor end 32 to the divider 50. The number of first channels 4 equals the number of second channels 40. The first channels 4 and the second channels 40 are pairwise aligned with each other. Each pair of a first channel 4 and a second channel 40 constitutes a passage extending from the first rotor end 31 in the axial direction A and parallel to the axis of rotation D to the second rotor end 32. The divider 50 is arranged in the passage to separate the first channel 4 from the second channel 40, so that no fluid can flow directly from the first channel 4 into the second channel 40.

The divider 50 is arranged in the middle between the first rotor end 31 and the second rotor end 32, so that the distance in axial direction A between the first rotor end 31 and the divider 50 equals the distance in axial direction A between the second rotor end 32 and the divider 50. Thus, all channels 4, 40 have the same length as measured in the axial direction A.

Each channel 4, 40 has a first axial end 41 and a second axial end 42. The second axial 42 end of each channel 4, 40 is located at the divider 50, wherein the second axial ends 42 of the first channels 4 are located on the left side of the divider 50 according to the representation in FIG. 1, and the second axial ends 42 of the second channels 40 are located on the right side of the divider 50 according to the representation in FIG. 1. The first axial end 41 of each first channel 4 is located at the first rotor end 31 and the first axial end 41 of each second channel 40 is located at the second rotor end 32.

The first axial end 41 of each channel 4, 40 is closed with respect to the axial direction A by a closing element 491. The closing element 491 can be configured as a plug, which closes the respective channel 4, 40 at its first axial end 41.

Thus, each channel 4, 40 can be manufactured by machining a longitudinally extending blind bore into the rotor 3. The first channels 4 are drilled into the rotor 3 from the first rotor end 31, and the second channels 40 are drilled into the rotor 3 from the second rotor end 32. The divider 50 comprises the wall between the blind bores drilled from the first rotor end 31 and the blind bores 32 drilled from the second rotor end 32. After the blind bores have been drilled the open end of each blind bore is closed by the closing element 491.

Furthermore, each channel 4, 40 has a first opening 45 and a second opening 46 for supplying and discharging the fluids to and from the channel 4, 40. Each first opening 45 and each second opening 46 are arranged in the circumferential surface 33 of the rotor 3, so that the fluids enter and leave each channel 4, 40 in the radial direction. For each channel 4, 40 the first opening 45 is arranged next to the first axial end 41 of the channel 4, 40, and the second opening 46 is arranged next to the second axial end 42 of the channel 4, 40. The first opening 45 and the second opening 46 can be manufactured by drilling or otherwise providing a lateral bore extending from the circumferential surface 33 of the rotor 3 in the radial direction to the longitudinal bore.

As can be best seen in FIG. 2 the plurality of first channels 4, for example up to sixteen first channels 4, is preferably arranged on a circle having its center on the axis of rotation D. The first channels 4 are arranged inside the rotor 3 and close to the circumferential surface 33 of the rotor 3. Each first channel 4 is fluidly connected to the circumferential surface 33 both by its first opening 45 and by its second opening 46. All first channels 4 are parallel to each other and preferably equidistantly distributed regarding the circumferential direction of the rotor 3, i.e. the distance between two adjacent first channels 4 as measured in the circumferential direction of the rotor 3 is preferably equal for each pair of adjacent first channels 4. In FIG. 2, a configuration with ten first channels 4 is shown.

The arrangement of the second channels 40 is analogous to the arrangement of the first channels 4. Since the first channels 4 and the second channels 40 are pairwise aligned with each other regarding the axial direction A, the arrangement of the second channels 40 look alike the arrangement shown in FIG. 2 for the first channels 4.

In the first embodiment, in each of the channels 4, 40 a separator 48 is provided for reducing a mixing of the first fluid and the second fluid. In each channel 4, 40 the separator 48 is arranged for a reciprocating movement between the first axial end 41 and the second axial end 42 of the channel 4, 40. The separator 48 can be configured for example as a free-floating or a freely sliding piston-like or ball-like separator 48. In particular, each separator 48 can be configured as a free floating piston or as a ball. The separator 48 works comparable to a hydraulic piston and transfers pressure between the two fluids.

At the first axial end 41 and/or at the second axial end 42 of each channel 4, 40 a distance pin 47 can be provided. The distance pins 47 extend into the channels 4, 40 to prevent a blocking of the first openings 45 and/or the second openings 46 by the separators 48. The distance pin 47 stops the movement of the separator 48, before the separator 48 completely covers the first opening 45 and/or the second opening 46 of the channel 4, 40. The distance pins 47 at the second axial 42 end of the channels 4, 40 can be attached to the divider 50 or form an integral part of the divider 50. The distance pins 47 at the first axial end 41 of the channels 4, 40 can be attached to the closing elements 491 or form an integral part of the closing elements 491.

Furthermore, the distance pins 47 can be configured as resilient elements, e.g. as springs.

The housing 2 comprises eight ports for supplying and discharging the fluids to and from the rotor 3, namely two first fluid inlet ports 21 for supplying the first fluid to the first channels 4 and to the second channels 40, two first fluid outlet ports 22 for discharging the first fluid from the first channels 4 and from the second channels 40, two second fluid inlet ports 25 for supplying the second fluid to the first channels 4 and to the second channels 40, as well as two second fluid outlet ports 26 for discharging the second fluid from the first channels 4 and from the second channels 40. In the first embodiment each of the first fluid inlet ports 21, the second fluid inlet ports 25, the first fluid outlet ports 22 and the second fluid outlet ports 26 is configured as a radial port, so that the first fluid and the second fluid enter and leave the rotor 3 in the radial direction as it is indicated by the arrows HB, LB, LW and HW in FIG. 1.

Without loss of generality is the first fluid the fluid which is available at a high pressure and the second fluid is the fluid having a low pressure. The second fluid is the fluid to which the pressure shall be transferred from the first fluid. The arrows HB indicate the first fluid entering the rotor 3 with a high pressure, and the arrows LB indicate the first fluid leaving the rotor 3 with a low pressure. The arrows LW indicate the second fluid entering the rotor 3 with a low pressure, and the arrows HW indicate the second fluid leaving the rotor 3 with a high pressure. The terms "high pressure" and "low pressure" have to be understood only in a comparative sense, namely that for each fluid "high pressure" designates a pressure that is higher than "low pressure" for the same fluid. The term "low pressure" used with respect to the first fluid does not have to refer to the same absolute value of the pressure than the term "low pressure" when used with respect to the second fluid. Analogously, the term "high pressure" used with respect to the first fluid does not have to refer to the same absolute value of the pressure than the term "high pressure" when used with respect to the second fluid.

One of the first fluid inlet ports 21 and one of the first fluid outlet ports 22 are arranged at the housing 2 close to the position of the first rotor end 31. The other of the first fluid inlet ports 21 and the other of the first fluid outlet ports 22 are arranged at the housing 2 close to the position of the second rotor end 32. The second fluid inlet ports 25 and the second fluid outlet ports 26 are arranged at the housing 2 close to the position of the divider 50. The second fluid inlet ports 25 and outlet ports 26 are arranged such that regarding the axial direction A the divider 50 is located between the two second fluid inlet ports 25 and between the two second fluid outlet ports 26, i.e. on each side of the divider 50 one of the second fluid inlet ports 25 and one of the second fluid outlet ports 26 are provided.

Preferably, the first fluid inlet port 21 and the first fluid outlet port 22 at the first rotor end 31 are arranged at the same axial position, i.e. at the same position regarding the axial direction A, and opposite each other with respect to the circumferential direction. Analogously, the first fluid inlet port 21 and the first fluid outlet port 22 at the second rotor end 32 are arranged at the same axial position, i.e. at the same position regarding the axial direction A, and opposite each other with respect to the circumferential direction.

Analogously, the second fluid inlet port 25 and the second fluid outlet port 26 provided at the left side of the divider 50 (according to the representation in FIG. 1) are arranged at the same axial position and opposite each other with respect to the circumferential direction. The second fluid inlet port 25 and the second fluid outlet port 26 provided at the right side of the divider 50 (according to the representation in FIG. 1) are arranged at the same axial position and opposite each other with respect to the circumferential direction.

Thus, the arrangement of all ports 21, 22, 25, 26 is mirror symmetric, wherein the mirror plane is the plain perpendicular to the axial direction A, which contains the divider 50

By arranging each of the first fluid inlet ports 21 opposite one of the first fluid outlet ports 22, the distance between the two ports 21, 22 measured in the circumferential direction of the rotor 3 can be maximized. By arranging each of the second fluid inlet ports 25 opposite one of the second fluid outlet ports 26 the distance between the two ports 25, 26 measured in the circumferential direction can be maximized. These measures are advantageous to decrease the leakage between the first fluid ports 21, 22 as well as the leakage between the second fluid ports 25, 26.

To further reduce the leakage between the first fluid inlet ports 21 and the first fluid outlet ports 22 as well as the leakage between the second fluid inlet ports 25 and the second fluid outlet ports 26, it is possible to optionally provide leakage preventing features 20 (see FIG. 2) at the inner wall of the housing 2 and at the same position with respect to the axial direction A, where the respective first fluid ports 21, 22 or the respective second fluid ports 25, 26 are located. Thus, the leakage preventing features 20 are optionally arranged in the leakage path extending between the first fluid inlet port 21 and the first fluid outlet port 22 at the same axial position along the outer circumference of the rotor 3, and/or the leakage preventing features 20 are optionally arranged in the leakage path extending between the second fluid inlet port 25 and the second fluid at outlet port 26 at the same axial position along the outer circumference of the rotor 3. The leakage preventing features 20 can be configured for example as ribs or as grooves. The leakage preventing features 20 can e.g. form a labyrinth or any kind of a throttle. Furthermore the leakage preventing features 20 can be advantageous to prevent cavitation.

The respective extension of each of the first fluid ports 21, 22 and the second fluid ports 25, 26 as measured in the circumferential direction can be increased as compared to an axial arrangement of the ports. By increasing the extension of the ports 21, 22, 25, 26 in the circumferential direction, the flow rate through the rotary pressure exchanger 1 can be increased, which is an advantage regarding the overall performance and economics of the rotary pressure exchanger 1.

During operation of the rotary pressure exchanger 1, the rotation of the rotor 3 is driven by the fluids, both by the first and the second fluid entering the rotor 3 as it is indicated by the arrows HB and LW. The rotary pressure exchanger 1 does not require an external motor. Also in view of the torque driving the rotation of the rotor 3 the configuration of the port 21, 22, 25, 26 as radial ports is advantageous. Because the fluids and in particular the first fluid enters the rotor 3 in the radial direction a large torque can be generated for driving the rotation of the rotor. A large torque for driving the rotor 3 has the advantage, that additional seals can be provided in particular between the rotor 3 and the stationary parts of the rotary pressure exchanger 1, which increases the efficiency. Furthermore, because a large torque is available it is also possible to provide contact bearings such as roller bearings for the support of the rotor 3 as an alternative or as a supplement to the hydrostatic support of the rotor 3, which will be described later on.

The principle mode of operation of the rotary pressure exchanger 1 is similar to the mode of operation as it is known from conventional rotary pressure exchangers, except for the fact, that all ports 21, 22, 25, 26 for both fluids are doubled. The high pressure first fluid is supplied to the rotor 3 through both first fluid inlet ports 21, as indicated by the arrows HB, and discharged from the rotor 3 through both first fluid outlet ports 22, as indicated by the arrows LB. The second fluid is supplied to the rotor 3 through both second fluid inlet ports 25, as indicated by the arrows LW, and discharged from the rotor 3 through both second fluid outlet ports 26, as indicated by the arrows HW.

Thus, the rotor 3 of the pressure exchanger 1 according to the disclosure comprises two pressure exchanger units, which are arranged in a back-to-back configuration and separated by the divider 50. The first pressure exchanger unit comprises the set of first channels 4 extending from the first rotor end 31 to the divider 50, and the second pressure exchanger unit comprises the set of the second channels 40 extending from the second rotor end 32 to the divider 50. According to the representation in FIG. 1 the first pressure exchanger unit is the unit on the left side of the divider 50 and the second pressure exchanger unit is the unit on the right side of the divider 50.

The first fluid ports 21, 22 and the second fluid ports 25, 26 of the first pressure exchanger unit are arranged mirror symmetrically to the first fluid ports 21, 22 and the second fluid ports 25, 26 of the second pressure exchanger unit. The mirror plane is the plain perpendicular to the axial direction A, which contains the divider 50.

In each pair of a first channel 4 and a second channel 40 aligned therewith the fluids flow in opposite directions in the first channel 4 and the second channel 40. In both the first channel 4 and the second channel 40 aligned therewith the respective fluid flows either from the respective rotor end 31, 32 towards the divider 50 or from the divider 50 to the respective rotor end 31, 32. This is the back-to-back arrangement.

It is also possible to interchange the location of first fluid ports 21, 22 and the second fluid ports 25, 26, i.e. the second fluid ports 25, 26 can be arranged at the first and the second rotor end 31, 32, and the first fluid ports 21, 22 are arranged adjacent to the divider 50.

During operation of the rotary pressure exchanger 1 a pressure exchange between the first fluid and the second fluid takes place in each of the channels 4, 40, w % herein in each channel 4, 40 the respective separator 48 reduces the mixing of the two fluids—as compared to rotary pressure exchangers without separators.

Since the principle mode of operation of a rotary pressure exchanger is known in the art, the mode of operation of the rotary pressure exchanger 1 will only be summarized. When the first opening 45 of a first channel 4 and the first opening 45 of the second channel 40 aligned with the first channel 4 pass the first inlet ports 21 during rotation of the rotor 3, the high pressure first fluid enters the first channel 4 and the second channel 40 as indicated by the arrows HB. Both in the first channel 4 and in the second channel 40 the high pressure first fluid pressurizes the low pressure second fluid via the respective separator 48 and pushes the pressurized second fluid out of the first channel 4 and out of the second channel 40 through the second openings 46 of the first channel 4 and the second channel 40. The pressurized second fluid is discharged through the second fluid outlet ports 26 as indicated by the arrows HW in FIG. 1. Thus, the second fluid is discharged through the second fluid outlet port 26 as high pressure second fluid. During the positive displacement of the second fluid in the first channel 4 and in the second channel 40 the respective separator 48 moves towards the divider 50 until the separator 48 is stopped by the distance pin 47.

By the movement of the separator 48, pressure—and therewith energy—is transferred from the first fluid to the second fluid, i.e. the second fluid is pressurized by the first fluid and discharged from the first channel 4 and the second channel 40 until the first channel 4 and the second channel 40 are essentially completely filled with the first fluid. Upon further rotation the first openings 45 pass the first outlet ports 22. Since the first fluid is now at a low pressure (due to the pressure transfer to the second fluid and subsequent contact with the low pressure second fluid inlet), the low pressure second fluid available at the second fluid inlet ports 25 enters the first channel 4 and the second channel 40 as indicated by the arrows LW in FIG. 1 and pushes the low pressure first fluid out of the first channel 4 and out of the second channel 40 as indicated by the arrows LB in FIG. 1. After that, the first channel 4 and the second channel 40 are essentially completely filled with the low pressure second fluid. Upon further rotation of the rotor 3, the first openings 45 of the first channel 4 and the second channel 40 again pass the first inlet ports 21 and the cycle starts anew.

Each separator 48 works comparable to a hydraulic piston and transfers pressure between the two fluids. Each separator 48 can be configured for example as a free floating piston or as a ball. Due to the back-to-back arrangement of the two pressure exchanger units and the pairwise alignment of the first channels 4 and the second channels 40, in each pair of a first channel 4 and a second channel 40 the movement of the two separators 48 is opposite and synchronized.

In each of the pressure exchanger units the separators 48 in the first channels 4 or second channels 40 cause a mechanical unbalance. The mechanical unbalance of the first pressure exchanger unit comprising the first channels 4 is a mirror image of the mechanical unbalance of the second pressure exchanger unit comprising the second channels 40. Therefore, the mechanical unbalance of the first pressure exchanger unit and the mechanical unbalance of the second pressure exchanger unit neutralize each other so that the rotor 1 in its entirety is much better balanced as compared to prior art devices with separators in the channels.

Due to the considerably improved balance of the rotor 1, the vibrations of the rotor 1 are remarkably reduced as compared to conventional rotary pressure exchangers with separators.

Figure 3:
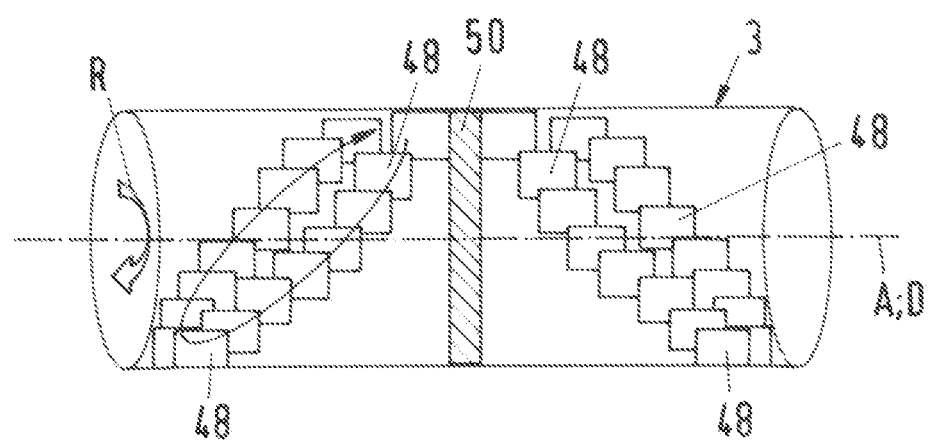
FIG. 3 illustrates a schematic illustration of the opposite unbalances of the pressure exchanger units.

For a better understanding FIG. 3 shows a schematic illustration of the opposite unbalances of the pressure exchanger units. FIG. 3 refers to an embodiment of the rotor 3 having sixteen first channels 4 and sixteen second channels 40 separated by the divider 50. The direction of rotation of the rotor is indicated by the arrow with the reference numeral R.

For the purpose of a better illustration the first channels 4 and the second channels 40 are not shown in FIG. 3 but only the separators 48 in the first channels 4 and the second channels 40. Regarding the illustration in FIG. 3 the first pressure exchanger unit comprising the first channels 4 is arranged on the left side of the divider 50 and the second pressure exchanger unit comprising the second channels 40 is arranged on the right side of the divider 50.

FIG. 3 shows a snapshot of the position of all separators 48 at a specific point of time. In each of the pressure exchanger units the separators 48 are equally distributed regarding the circumferential direction of the rotor 3, wherein adjacent separators 48 are displaced to each other with respect to the axial direction A.

As can be clearly seen in FIG. 3, the position of the separators 48 of the first pressure exchanger unit (left side) is a mirror image of the position of the separators 48 of the second pressure exchanger unit (right side). This mirror symmetric arrangement of the separators 48 with respect to the divider 50 applies for each moment in time during the rotation of the rotor 3.

Thus, by the back-to-back arrangement of the two pressure exchanger units opposite unbalances are created in the first and the second pressure exchanger unit. These opposite unbalances compensate each other, so that the entire rotor 3 is balanced.

By way of example, in the following description reference is made to an important application, namely that the rotary pressure exchanger 1 is used as an energy recovery device in a reverse osmosis system, in particular in a SWRO system.

In a SWRO system reverse osmosis is used for the desalination of seawater. The reverse osmosis system comprises a membrane unit having a membrane for performing the reverse osmosis process. The membrane unit has an inlet for receiving a feed fluid, here seawater, a permeate outlet for discharging a permeate fluid, here fresh water, and a concentrate outlet for discharging a concentrate fluid which is called brine in SWRO applications. The membrane unit is supplied with the feed fluid seawater comprising water as a solvent and solutes like dissolved solids, molecules or ions. Essentially only the water can pass the membrane and will leave the membrane unit as the permeate fluid, namely fresh water. The seawater has to be supplied to the membrane with a high pressure being high enough to overcome the osmotic pressure. Therefore, the brine leaving the membrane unit is typically still under quite a high residual pressure which can be up to 95% (or even more) of the feed pressure, i.e. the high pressure under which the seawater is supplied to the membrane unit. This residual pressure of the brine makes it possible to recover part of the pressurizing energy by an energy recovery device, such as the rotary pressure exchanger 1 according to the disclosure.

Thus, in the following description of the preferred embodiments of the disclosure reference is made to the important practical application that the rotary pressure exchanger 1 is used as an energy recovery device in a SWRO system. In such an application the first fluid is the brine. i.e. the concentrate fluid discharged from the membrane unit, and the second fluid is the seawater that has to be pressurized prior to supplying it to the membrane unit.

The brine discharged from the membrane unit is supplied to both first inlet ports 21 of the rotary pressure exchanger 1 as indicated by the arrows HB in FIG. 1. The pressure of the brine discharged from the membrane unit is usually only a few percentage, for example at most 5%, lower than the feed pressure, with which the seawater is supplied to the membrane unit. The pressure of the brine at the first inlet ports 21 is for example between 55 bar and 60 bar (5.5 MPa-6.0 MPa). The seawater is supplied to both second fluid inlet ports 25, for example by a seawater supply pump, as it is indicated by the arrows LW in FIG. 1. Usually, the seawater is supplied to the second inlet ports 25 with a small overpressure, e.g. between one and two bar (0.1 to 0.2 MPa) overpressure.

In the rotor 3 of the rotary pressure exchanger 1 the pressure is transferred by positive displacement from the brine to the seawater. The seawater is discharged at the second fluid outlet ports 26 as indicated by the arrows HW with a pressure, which is only slightly smaller, for example about 2% smaller, than the pressure of the brine at the first fluid inlet ports 21. The discharged high pressure seawater is then for example merged into a pressurized seawater flow generated by a high pressure pump. The pressurized seawater flow is supplied to the inlet of the membrane unit. The depressurized brine having usually an overpressure of less than one bar is discharged from the first channels 4 and the second channels 40 of the rotor 3 through the first fluid outlet ports 22 by the seawater entering the first channels 4 and the second channels 40 from the second fluid inlet ports 25. The discharge of the low pressure brine is indicated by the arrows LB.

As can be best seen in FIG. 1, in the first embodiment of the rotary pressure exchanger 1, the rotor 3 is arranged regarding the axial direction A between a first end cover 5 and a second end cover 6. Both end covers 5, 6 are arranged inside the housing 2 and arranged stationary with respect to the housing 2. Each end cover 5, 6 has a generally cylindrical shape. Preferably, the outer diameter of the end covers 5, 6 is essentially the same as the inner diameter of the housing 2. Thus, the outer diameter of the end covers 5, 6 differs from the diameter of the circumferential surface 33 of the rotor only by the radial extension of the rotor clearance 81.

Regarding the axial direction A the first end cover 5 and the second end cover 6 are arranged very close to the axial faces of the rotor 3 at the first rotor end 31 and the second rotor end 32, so that there is only a small axial clearance 82 between the first rotor end 31 and the first end cover 5 as well as between the second rotor end 32 and the second end cover 6. The axial clearance 82 is configured to allow for a free rotation of the rotor 3, i.e. such that the rotor 3 does not contact the first end cover 5 or the second end cover 6. On the other hand, the axial clearance 82 is very narrow to limit the leakage flow along the first rotor end 31 and the second rotor end 32.

The first end cover 5 and the second end cover 6 are supported by the housing 2 to withstand the pressure resulting from the pressurized fluids. In particular, the housing 2 provides support to the end covers 5 and 6 such, that the distance regarding the axial direction A between the first end cover 5 and the second end cover 6 does not change during operation, at least not significantly. The housing 2 can comprise an essentially cylindrical housing body 2a having an inner diameter which equals the outer diameter of the end covers 5, 6, and a cover 2b for closing the housing body 2a. For assembling the rotary pressure exchanger 1, firstly, the second end cover 6 is inserted into the housing body 2a. After that, the rotor 3 is inserted into the housing body 2a. The first end cover 5 is placed into the cover 2b of the housing 2 and the cover 2b is firmly secured to the housing body 2a, e.g. by a flange connection 2c, so that the rotor 3 is arranged between the first end cover 5 and the second end cover 6 regarding the axial direction A. The first end cover 5 and the second end cover 6 are reliably supported, in particular regarding the axial direction A, by the housing 2.

As can be best seen in FIG. 1, each of the first rotor end 31 and the second rotor end 32 comprises a bearing pin 35 extending in the axial direction A. Each bearing pin 35 has a cylindrical shape and is arranged coaxially with the axis of rotation D. Both bearing pins 35 are configured in an identical manner. The outer diameter of each cylindrical bearing pin 35 is significantly smaller than the outer diameter of the circumferential surface 33 of the rotor 3. The bearing pins 35 constitute an extension of the rotor 3 in the axial direction A.

Each end cover 5, 6 comprises a centrally arranged bearing recess 56, which is configured for receiving one of the bearing pins 35. Each bearing pin 35 engages with one of the bearing recesses 56 for providing support to the rotor 3. The rotor 3 is journaled by the bearing pins 35 engaging with the bearing recesses 56 both with respect to the axial direction A and with respect to the radial direction. The bearing pins 35 and the bearing recesses 56 are configured such that there is only a narrow clearance between the respective bearing recess 56 and the bearing pin 35 engaging therewith. Each clearance forms a plurality of bearing flow passages for providing a hydrostatic support of the rotor 3 during operation. The clearance between the bearing recess 56 and the bearing pin 35 enables a hydrostatic journal or radial bearing for the rotor 3 as well as a hydrostatic axial or thrust bearing for the rotor 3.

The clearance between each bearing pin 35 and the bearing recess 56 the bearing pin 35 is engaging with, comprises a radial bearing flow passage 61 and an axial bearing flow passage 62. Each radial bearing flow passage 61 is configured as an annular gap surrounding one of the bearing pins 35. Each axial bearing flow passage 62 is configured as a gap arranged between the axial end face of one of the bearing pins 35 and the bottom of the respective bearing recess 56 facing the axial end face of the bearing pin 35. During operation, each radial bearing flow passage 61 provides hydrostatic radial support of the rotor 3 and each axial bearing flow passage 62 provides hydrostatic axial support of the rotor 3. Thus, there is no need for any additional bearings, such as anti-friction bearing, e.g. ball bearings or ceramic roller bearings. Of course, in other embodiments anti-friction bearings or other types of bearings can be provided for the support of the rotor 3, either as a supplement or as an alternative to the hydrostatic bearings.

Both the first end cover 5 and the second end cover 6 can comprise supply passages and discharge passages to supply the first or the second fluid to the bearing flow passages 61, 62 and to discharge the first or the second fluid from the bearing flow passages 61, 62. For the sake of clarity these supply and discharge passages are not shown in FIG. 1.

As it can be best seen in FIG. 1, the rotor 3 is configured—except for the closing elements 491 and the distance pins 47—as a one-piece part, i.e. the bearing pins 35 are integrally formed with the first rotor end 31 and the second rotor end 32, respectively. The rotor 3 can be manufactured by providing a solid blank comprising the cylindrical part delimited by the circumferential surface 33 and the two bearing pins 35 provided at the first rotor end 31 and the second rotor end 32, respectively. The first channels 4 and the second channels 40 are then manufactured by providing the longitudinal bores and the lateral bores as it has been described hereinbefore. After the channels 4, 40 have been finished the first axial ends 41 of the channels 4, 40 are closed by the closing elements 491. Thus, the rotor 3 comprises an axle 36 formed by the two bearing pins 35 and a middle part 38 connecting the two bearing pins 35, as well as a rotor body 37 surrounding the axle 36, wherein all channels 4, 40 are arranged in the rotor body 37. The rotor body 37 is integrally formed with the axle 36.

Each of the first end cover 5 and the second end cover 6 is configured as a one-piece part. Each end cover 5, 6 can be manufactured by providing a cylindrical blank and machining the bearing recess 56 into the blank. Each end cover 5, 6 has a very simple geometry and, in particular, does not require any ports or additional channels for supplying or discharging the fluids to or from the channels 4, 40 of the rotor 3. Therefore, the manufacturing becomes cheaper and less time consuming as compared to rotary pressure exchanger, in which the fluids are supplied to and discharged from the rotor through the stationary end covers.

Preferably, the one-piece rotor 3, i.e. the axle 36 and the rotor body 37 integrally formed therewith as well as the end covers 5 and 6 are made of a ceramic material, e.g. alumina ceramic. Ceramic materials have the advantage to have a very high dimensional stability and, if at all, only a negligible wear so that the clearances between the rotating parts and their respective stationary mating partners can be configured very narrow. In particular, the radial bearing flow passages 61 and the axial bearing flow passages 62, can be dimensioned very narrow. e.g. having a width of only a few micrometers.

The configuration with the bearing pins 35 engaging with the bearing recesses 56 for providing radial and axial support to the rotor 3 has the advantage, that there is no need for an outer stationary sleeve surrounding the rotor for providing support to the rotor and for positioning the rotor. Therefore, compared to known rotary pressure exchangers having a sleeve-based positioning of the rotor, the outer diameter of the rotor 3 can be increased without increasing the inner diameter of the housing 2. Therewith, the maximum flow rate of the rotary pressure exchanger 1 in relation to the size of the rotor 3 is increased.

In a variant of the first embodiment, the main components of the rotor 3, namely the axle 36 and the rotor body 37 are made of different materials. For example, the axle 36 can be made of a first material and the rotor body 37 can be made of a second material, wherein the first material is different from the second material. Preferably, the first material is a ceramic material. Furthermore, it is preferred that the second material is a metallic material, for example titanium. In particular for applications in SWRO systems or in other systems, where at least one of the fluids is corrosive, the metallic material is preferably a metal or an alloy having a high corrosion resistance.

In this variant, the rotor body 37 is fixedly connected to the axle 36 in a torque proof manner. Furthermore, the fixation of the rotor body 37 to the axle 36 preferably does not allow for a relative movement of the rotor body 37 and the axle 36 in the axial direction A. The rotor body 37 is for example fixed to the axle 36 by a shrink-fit.

Making the axle 36 of a ceramic material and the rotor body 37 of a metallic material has the advantage that the axle 36 can be manufactured such that the clearances to the stationary mating partners of the axle 36, e.g. the radial bearing flow passages 61 and the axial bearing flow passages 62, are very narrow. Thus, a stable hydrostatic support in combination with a very low leakage flow through the clearances results. On the other hand, the rotor body 37 made of a metallic material is easier to machine. For example, it might be less laborious to manufacture the first channels 4 and the second channels 40 in the rotor body 37.

According to another variant of the first embodiment the axle 36 of the rotor 3 can be configured as a hollow axle comprising a central opening extending completely through the axle 36 in the axial direction A. Each end cover 5, 6 comprises a central bore aligned with the central opening. Each central bore extends completely through the respective end cover 5, 6 in the axial direction A. A bolt is provided in the hollow axle. The bolt extends in the axial direction A through both central bores and through the central opening. The bolt is secured to the first end cover and to the second end cover, so that the bolt is stationary, i.e. non-rotating, during operation. For fixing the bolt to the end covers 5, 6 for example a nut can be provided at each end cover 5, 6, wherein the nut engages with a threaded end portion of the bolt. The bolt functions as a tie rod which rigidly connects and fixes the first end cover 5 and the second end cover 6 to each other. The rotor 3 is firmly supported during rotation between the first end cover 5 and the second end cover 6. The bolt can be made of a metallic material. The clearance in the central opening between the bolt and the radially inner wall delimiting the hollow axle can be filled with the first fluid or with the second fluid to provide hydrostatic support to the rotor 3.

As a further variant the bolt can comprises a central core extending in the axial direction A along the entire length of the bolt and a sleeve arranged coaxially with the core and abutting against the core, wherein the sleeve is made of a first material, preferably a ceramic material. The central core is made of a second material, preferably a metallic material, wherein the first material is different from the second material. With respect to the axial direction A the sleeve extends from the central bore in the first end cover 5 to the central bore in the second end cover, such that the threaded end portions are not surrounded by the sleeve. The stationary sleeve serves for aligning the end covers 5, 6 with the rotor 3 and for supporting the rotor 3 by a hydrostatic bearing between the sleeve and the radially inner wall delimiting the central opening of the hollow axle. The sleeve is preferably made of a ceramic material to allow for a high dimensional precision regarding the alignment of the components as well as for a very narrow clearance between the sleeve and the radially inner wall of the axle delimiting the central opening.

As still another variant the bolt is configured as a cylindrical solid pole extending from the central bore in the first end cover in axial direction A to the central bore in the second end cover 6. The bolt is fixed to the first end cover 5 by a fixing element engaging with one of the axial ends of the bolt. The bolt is fixed to the second end cover by a fixing element engaging with the other axial ends of the bolt. The fixing elements can be configured for example as screws, wherein each screw engages with a thread provided in the respective axial end of the bolt. In this variant the bolt is preferably made of a metallic material. Of course, the bolt can also be made of a ceramic material, in particular, if a high precision is required or desired.

FIG. 4 shows a schematic cross-sectional view of a second embodiment of a rotary pressure exchanger 1 according to the disclosure in a cut along the axial direction A.

In the following description of the second embodiment of a rotary pressure exchanger 1 only the differences to the first embodiment and its variants are explained in more detail. The explanations with respect to the first embodiment and its variants are also valid in the same way or in analogously the same way for the second embodiment. Same reference numerals designate the same features that have been explained with reference to the first embodiment and its variant or functionally equivalent features.

In the second embodiment of the rotary pressure exchanger 1 a sleeve positioning concept is used for supporting the rotor 3. The second embodiment is not provided with the bearing pins 35 and the bearing recesses 56 in the end covers 5, 6. The rotor 3 has an overall shape of a cylinder.

In the second embodiment the rotor 3 is surrounded by a stationary rotor sleeve 29. Regarding the axial direction A, the rotor sleeve 29 extends from the first end cover 5 to the second end cover 6, with the rotor sleeve 29 arranged stationary with respect to the housing 2. The rotor 3 is arranged within the rotor sleeve 29, so that the rotor sleeve 29 surrounds the circumferential surface 33 of the rotor 3. The rotor 3 and the rotor sleeve 29 arranged coaxially with the rotor 3 are configured such that there is only a narrow clearance between the circumferential surface 33 of the rotor 3 and the rotor sleeve 29. During operation of the device the narrow gap between the rotor 3 and the rotor sleeve 29 provides a hydrodynamic and/or hydrostatic support of the rotor 3.

The rotor sleeve 29 is clamped between the first end cover 5 and the second end cover 6. The axle 36 of the rotor 3 is configured as a hollow axle having a central opening 361 extending completely through the axle 36 in the axial direction A. Each end cover 5, 6 comprises a central bore 80 aligned with the central opening 361. Each central bore 80 extends completely through the respective end cover 5, 6 in the axial direction A. A bolt 9 is provided in the hollow axle 36. The bolt 9 extends in the axial direction A through both central bores 80 and through the central opening 361. The hollow axle 36 constitutes an internal part of the rotor 3 being stationary with respect to the rotor 3. The bolt 9 is fixed to the first end cover 5 as well as to the second end cover 6 by fixing elements 96, so that the bolt 9 is stationary. i.e. non-rotating, during operation. The fixing elements 96 are configured for example as nuts or screws. By the bolt 9 and the fixing elements 96 the end covers 5, 6 are rigidly and firmly secured to each other with the rotor sleeve 29 clamped therebetween. Preferably, the central opening 361 is connected to a source for a high pressure fluid, e.g. the high pressure first fluid or the high pressure second fluid by a fluid passage (not shown). Furthermore, a drainage passage (not shown) can be provided to discharge fluid from the central opening 361.

FIG. 5 shows a schematic cross-sectional view of a third embodiment of a rotary pressure exchanger 1 according to the disclosure in a cut along the axial direction A.

In the following description of the third embodiment of a rotary pressure exchanger 1 only the differences to the first and the second embodiment and their variants are explained in more detail. The explanations with respect to the first and the second embodiment as well as their variants are also valid in the same way or in analogously the same way for the third embodiment. Same reference numerals designate the same features that have been explained with reference to the first and the second embodiment and their variants or functionally equivalent features.

In an analogous manner to the second embodiment also in the third embodiment of the rotary pressure exchanger 1 a sleeve positioning concept is used for supporting the rotor 3. The rotor 3 is surrounded by the stationary rotor sleeve 29. Regarding the axial direction A, the rotor sleeve 29 extends from the first end cover 5 to the second end cover 6 and is clamped between the first end cover 5 and the second end cover 6, so that the rotor sleeve 29 is arranged stationary with respect to the housing 2.

In contrast to the first and the second embodiment, in the third embodiment each first fluid inlet port 21 is configured as an axial inlet port, such that the first fluid enters the rotor 3 in the axial direction A, and each first fluid outlet port 22 is configured as an axial outlet port, such that the first fluid leaves the rotor 3 in the axial direction A. The configuration as axial inlet ports or axial outlet port as such is known in the art, e.g. from U.S. Pat. No. 10,125,796 and therefore does not require a detailed description.

The housing 2 comprises the eight ports 21, 22, 25, 26. The second fluid inlet ports 25 and the second fluid outlet port 26 are arranged in the same manner as it has been described for the first and the second embodiment.

In the third embodiment the first fluid inlet ports 21 and the first fluid outlet ports 22 are arranged at the axial end faces 28 of the housing 2. At the axial end face 28 arranged adjacent to the first end cover 5 one of the first fluid inlet ports 21 and one of the first fluid outlet ports 22 are provided. At the axial end face 28 arranged adjacent to the second end cover 6 one of the first fluid inlet ports 21 and one of the first fluid outlet ports 22 are provided.

Each end cover 5, 6 comprises a first fluid supply channel 70 extending from the first fluid inlet port 21 in axial direction A completely throughout the respective end cover 5, 6, so that the first fluid can be supplied to the rotor 3 in the axial direction A from the first fluid inlet ports 21 through the first fluid supply channels 70.

In addition, each end cover 5, 6 comprises a first fluid discharge channel 75 extending from the first fluid outlet port 22 in axial direction A completely throughout the respective end cover 5, 6, so that the first fluid can be discharged from the rotor 3 in the axial direction A through the first fluid discharge channels 75 and the first fluid outlet ports 22.

In the third embodiment of the rotary pressure exchanger 1 the first opening 45 of each first channel 4 and of each second channel 40 is arranged at the first axial end 41 of the respective channel 4, 40. Thus, the first fluid can enter the first channels 4 and the second channels 40 in the axial direction A through the first fluid supply channel 70 and the respective first opening 45, w % ben the respective first opening 45 is in fluid communication with the first fluid supply channel 70 during the rotation of the rotor 3. Furthermore, the first fluid can be discharged from the first channels 4 and the second channels 40 in the axial direction A through the respective first opening 45 and the first fluid discharge channel 75, when the respective first opening 45 is in fluid communication with the first fluid discharge channel 75 during the rotation of the rotor 3.

FIG. 6 shows a schematic cross-sectional view of a fourth embodiment of a rotary pressure exchanger 1 according to the disclosure in a cut along the axial direction A.

In the following description of the fourth embodiment of a rotary pressure exchanger 1 only the differences to the first three embodiments and their variants are explained in more detail. The explanations with respect to the first, second and third embodiment as well as their variants are also valid in the same way or in analogously the same way for the fourth embodiment. Same reference numerals designate the same features that have been explained with reference to the first, second and third embodiment and their variants or functionally equivalent features.

The fourth embodiment of the rotary pressure exchanger 1 is configured similar to the first embodiment (FIG. 1, FIG. 2). However, the fourth embodiment is configured without any separators 48 in the channels 4, 40. The pressure transfer between the first fluid and the second fluid takes place by a direct contact between the first fluid and the second fluid in the channels 4, 40.

Furthermore, since the fourth embodiment does not comprise the separators 48 in the channels 4, 40, there is no need to provide the distance pins 47. Therefore the fourth embodiment is configured without distance pins 47.

FIG. 7 shows a schematic cross-sectional view of a fifth embodiment of a rotary pressure exchanger 1 according to the disclosure in a cut along the axial direction A.

In the following description of the fifth embodiment of a rotary pressure exchanger 1 only the differences to the first four embodiments and their variants are explained in more detail. The explanations with respect to the first, second, third and fourth embodiment as well as their variants are also valid in the same way or in analogously the same way for the fifth embodiment. Same reference numerals designate the same features that have been explained with reference to the first, second, third and fourth embodiment and their variants or functionally equivalent features.

The fifth embodiment of the rotary pressure exchanger 1 is configured similar to the third embodiment (FIG. 5). However, the fifth embodiment is configured without any separators 48 in the channels 4, 40. The pressure transfer between the first fluid and the second fluid takes place by a direct contact between the first fluid and the second fluid in the channels 4, 40.

Furthermore, since the fifth embodiment does not comprise the separators 48 in the channels 4, 40, there is no need to provide the distance pins 47. Therefore the fifth embodiment is configured without distance pins 47.

The invention claimed is:

1. A rotary pressure exchanger for transferring pressure from a first fluid to a second fluid, comprising;
   a housing; and
   a rotor mounted within the housing, and configured to rotate about an axis of rotation defining an axial direction, the rotor extending from a first rotor end in the axial direction to a second rotor end, a plurality of channels disposed inside the rotor and being configured to transfer pressure from the first fluid to the second fluid, and each channel of the plurality of channels extends parallel to the axis of rotation, the plurality of channels comprising a set of first channels and a set of second channels, and the rotor comprises a divider arranged between the first rotor end and the second rotor end to separate the first channels from the second channels, each first channel of the set of first channels extending from the first rotor end in the axial direction to the divider, and each second channel of the set of second channels extending from the second rotor end in the axial direction to the divider, and
   the housing comprising two first fluid inlet ports to supply the first fluid to the first set of channels and to the second set of channels, two first fluid outlet ports to discharge the first fluid from the first set of channels and from the second set of channels, two second fluid inlet ports to supply the second fluid to the first set of channels and to the second set of channels, two second fluid outlet ports for discharging the second fluid from the first set of channels and from the second set of channels, the first fluid inlet ports and the first fluid outlet ports arranged at the first and the second rotor ends, and the second fluid inlet ports and the second fluid outlet ports arranged adjacent the divider with respect to the axial direction.

2. The rotary pressure exchanger in accordance with claim 1, wherein a number of the set of first channels equals the number of the set of second channels, and the set of first channels and the set of second channels are pairwise aligned with each other.

3. The rotary pressure exchanger in accordance with claim 1, wherein all of the first and second sets of channels have a same length as measured in the axial direction.

4. The rotary pressure exchanger in accordance with claim 1, wherein each of the second fluid inlet ports is a radial inlet port, such that the second fluid enters the rotor in a radial direction perpendicular to the axial direction, and each of the second fluid outlet ports is a radial outlet port, such that the second fluid leaves the rotor in the radial direction.

5. The rotary pressure exchanger in accordance with claim 1, wherein the rotor comprises a circumferential surface delimiting the rotor with respect to the radial direction, each of the plurality of channels comprises a first opening and a second opening for the first and second fluids, each of the first openings is arranged adjacent the divider and each of the second openings is arranged adjacent the first rotor end or adjacent the second rotor end, and each of the first openings is arranged in the circumferential surface of the rotor.

6. The rotary pressure exchanger in accordance with claim 5, wherein each of the second openings is arranged in the circumferential surface of the rotor.

7. The rotary pressure exchanger in accordance with claim 1, wherein each of the first fluid inlet ports is a radial inlet port, such that the first fluid enters the rotor in the radial direction perpendicular to the axial direction, and wherein each of the first fluid outlet ports is a radial outlet port, such that the first fluid leaves the rotor in the radial direction.

8. The rotary pressure exchanger in accordance with claim 1, wherein each of the first fluid inlet ports is an axial inlet port, such that the first fluid enters the rotor in the axial direction, and each of the first fluid outlet ports is an axial outlet port, such that the first fluid leaves the rotor in the axial direction.

9. The rotary pressure exchanger in accordance with claim 1, further comprising a first end cover and a second end cover, each of the first and second end covers being stationary with respect to the housing, and the rotor being disposed between the first end cover and the second end cover in the axial direction.

10. The rotary pressure exchanger in accordance with claim 9, wherein each of the first and second end cover covers is made of a ceramic material.

11. The rotary pressure exchanger in accordance with claim 9, wherein each of the first and second rotor ends comprises a bearing pin extending in the axial direction and configured coaxially with the axis of rotation, and each of the first and second end covers comprises a bearing recess configured to receive a respective bearing pin.

12. The rotary pressure exchanger in accordance with claim 11, wherein for each of the first and second rotor ends a radial bearing flow passage and an axial bearing flow passage are disposed between the bearing recess and the bearing pin, each radial bearing flow passage is configured to provide hydrostatic radial support of the rotor, and each axial bearing flow passage is configured to provide hydrostatic axial support of the rotor.

13. The rotary pressure exchanger in accordance with claim 9, further comprising a rotor sleeve extending regarding the axial direction from the first end cover to the second end cover, with the rotor sleeve arranged stationary with respect to the housing, the rotor is arranged within the rotor sleeve, so that the rotor sleeve surrounds the circumferential surface of the rotor.

14. The rotary pressure exchanger in accordance with claim 1, wherein in each of the plurality of channels a freely sliding separator is disposed to reduce a mixing of the first fluid and the second fluid.

* * * * *